Figure 1:
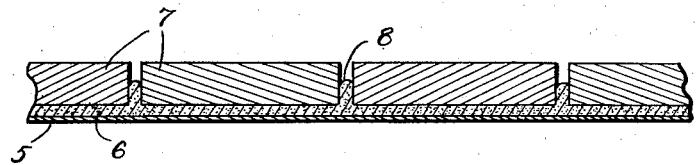

Oct. 7, 1930.   H. BROWN   1,777,872
PLASTER BOARD
Filed March 8, 1928

Inventor:
Haughton Brown
By
Wilson & McCanna
Attys.

Patented Oct. 7, 1930

1,777,872

UNITED STATES PATENT OFFICE

HAUGHTON BROWN, OF ROCKFORD, ILLINOIS, ASSIGNOR OF ONE-HALF TO JESSE A. BARLOGA, OF ROCKFORD, ILLINOIS

PLASTER BOARD

Application filed March 8, 1928. Serial No. 259,956.

This invention relates to improvements in building materials and has more particular reference to a new plaster board or sheathing.

The plaster board of my invention has been used to good advantage in place of the ordinary lathing and mortar to serve as a plaster base in interior building constructions, but may be employed generally for exterior sheathing purposes, especially for stucco or brick veneer buildings, or even in roofing and flooring. In short the present material is one designed for use similarly as other well known kinds of so-called wall board and may be used for other purposes where the ordinary kind of wall board would be absolutely unsuited and impractical.

Without going further to enumerate at this point the characteristics of the present material by reason of which the same is adapted for a wider range of uses and is better adapted for uses to which the ordinary kind of wall board has heretofore been put, I shall now refer to the accompanying drawing in connection with which the following specification is to be read.

In the drawing—

Figure 2:
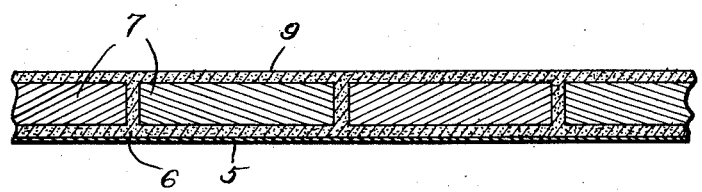
Figure 3:
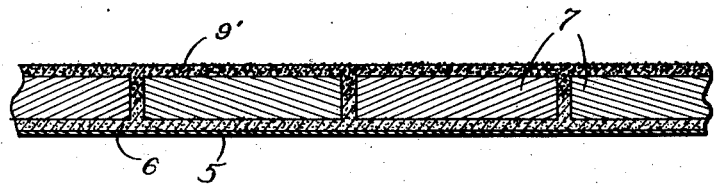

Figure 1 is a cross-section through a piece of plaster board made in accordance with my invention and using my improved composition;

Fig. 2 is a similar view showing what may be regarded either as a modified or alternative board construction or as a board of the kind shown in Fig. 1 which has received a plaster base coating "on the job"; and Fig. 3 is a view similar to Fig. 2, made up complete in the form shown before application to the studding or else made up in the form shown in Fig. 1, applied to the studding, and then covered with a plaster base coating, the latter in this case being of a somewhat different composition from that used in the case of the board shown in Fig. 2, as will presently appear.

Similar reference numerals are applied to corresponding parts in the three views.

In the manufacture of the board shown in Figs. 1–3, as well as in the application of a plaster base coating to a wall where board of the type shown in Fig. 1 is used, I prefer to employ an asbestos plaster composition as follows—

30% sodium silicate (water glass—commercial) or the equivalent,
20% wood flour (fine sawdust) or other refuse filler,
50% asbestos (short fibers).
(The above percentages are by weight.)

The wood flour and asbestos are first thoroughly mixed and are then made into a plastic mass with the water glass. It should be understood that I in nowise confine myself to the exact proportions just given nor to the kind of filler used. This mixture gives a composition particularly well suited for the present purposes for the reason that it makes a very tenacious bond with wood and plaster alike, thus avoiding the necessity in wall construction for the use of mortar as a base for plaster or stucco, as many as two coats of mortar having been necessitated heretofore with the ordinary kind of wall board. Further reference to the latter point is made hereinafter.

The mastic composition which I prefer to employ where board of the kind shown in Fig. 1 has been applied to the studding and a "scratch coat" is to be applied to cover the same so as to permit the direct application of the finish plaster coat is as follows—

25% sodium silicate (water glass—commercial) or the equivalent,
15% water,
45% sand (building sand),
15% asbestos (short fibers).
(The above percentages are by weight.)

The above composition may be modified to the extent of adding granulated cork (refuse) and correspondingly cutting down the amount of sand used, or else cork may be substituted for the sand, equivalent volumes of cork taking the place of equivalent volumes of sand in either case. The use of the sand I have found results in a much better bonding surface for the application of the plaster. It also cheapens the composition to a certain extent and I have also found that it reduces the amount of shrinkage in drying.

In manufacturing the plaster board, which it should be understood will be furnished in pieces of the usual standard sizes required, a sheet 5 of building paper or tarred felt is used as a backing and coated with asbestos plaster of the composition first above described, as indicated at 6. Then, ordinary laths 7, or other pieces of scrap lumber of suitable thickness, are laid thereon making sure to have the plaster ooze up between the laths, as at 8, so as to be certain of the proper bondage. A sheet of the material made up in this way is then left to dry and it will be evident that one sheet can be laid directly on top of another in a stack without adhesion of one sheet to another. This has the advantage not only of facilitating manufacture but also of preventing warpage of the sheets in drying. The sheets when thoroughly dried are comparatively rigid, much more so than the ordinary kind of wall board, and are practically indestructible; they will not crack or break like ordinary wall board if dropped or not laid absolutely flat when stacked. Nails can be driven therethrough as easily as through lumber of the same thickness, or even with less effort, and the nails will not pull through as they frequently do in the case of ordinary wall board, nor will they crack the material even where they are put through near the edges. Plaster board has always been particularly subject to the latter objection.

The board shown in Fig. 2 differs from that shown in Fig. 1 in having a face coating 9 of asbestos plaster of the same composition as the coating 6 and suitably of about the same thickness. This coat may be applied in the manufacture of the board at the factory, although at this time I believe it is preferable to make the board as shown in Fig. 1 and later apply the coat 9 on the job, that is, after the board has been nailed to the studding in a building construction. The asbestos plaster employed I have found avoids the necessity for applying any mortar to serve as a base for the plaster, in the case of interior construction, or stucco, in the case of exterior construction. The saving in cost, both for material and labor, which is realized as a result of my invention can easily be appreciated. But there is the further advantage that only a small fraction of the amount of time is required thoroughly to dry out the walls than was otherwise required. The decorating and other interior finishing are brought way ahead in the building schedule by virtue of this invention.

The board shown in Fig. 3 corresponds to that shown in Fig. 2 with the exception that the face coat 9' or "scratch coat" is of the asbestos plaster composition having sand in it. This composition, I believe, will be found preferable by many for the reason that the rougher surface afforded thereby makes a much better bond with plaster, at least as good as that afforded by mortar, if not better. It is understood, of course, that in this construction likewise it is the intention to dispense with the application of the one or two coats of mortar which were otherwise required.

In the preceding description some reference has been made to the fact that the present material is much more rigid than the ordinary wall board and that it does not have to be handled as carefully. It follows, then, that a much more rigid construction is made when this board is used than where the ordinary wall board is used. The material has many other characteristics which particularly recommend the same for use in the various ways above referred to. For instance—

(1) It is an insulation, being fire resisting, as well as being a poor conductor of heat or cold.

(2) It is waterproof, there being no indication of shrinking or swelling, which in the case of ordinary plaster board and wall board resulted in surface cracks or bulges in the plaster.

(3) It is a sound deadener.

(4) It is fairly inexpensive inasmuch as checked lumber can be used such as would not be good enough for ordinary plastering laths.

I claim:

1. A plaster board of the character described comprising a sheet backing of suitable material covered on one side with a coat of mastic asbestos plaster comprising about 30% of commercial water glass, 20% of wood flour and 50% short fiber asbestos, by weight, and wooden slats laid side by side on the plaster, the slats being sufficiently impressed in the plaster to cause the latter to ooze up between the edges of the adjoining slats for better bonding.

2. A plaster board of the character described comprising a sheet backing of suitable material covered on one side with a coat of mastic asbestos plaster, and wooden slats laid side by side and in slightly spaced relation in the plaster leaving crevices between the uncovered portions of the slats, the slats being then adapted to be covered with another coat of mastic plaster material, the latter being arranged to key in the aforesaid crevices.

3. A plaster board of the character described comprising a sheet backing of suitable material covered on one side with a coat of mastic asbestos plaster comprising about 30% of commercial water glass, 20% of wood flour and 50% short fiber asbestos, by weight, wooden slats laid side by side in the plaster with the edges thereof slightly spaced from one another, and a face coat of mastic asbestos plaster herein set forth covering the slats and bonding with the other plaster coat in between the slats in addition to the bonding with the slats themselves.

4. A plaster board as set forth in claim 3 wherein the last mentioned plaster coat contains a coarse granular material whereby it serves as a scratch coat for the direct application of a finish coat of plaster thereon.

In witness of the foregoing I affix my signature.

HAUGHTON BROWN.